United States Patent Office 3,149,107
Patented Sept. 15, 1964

3,149,107
4-CYANOISOTHIAZOLESULFENAMIDES
William R. Hatchard, Wilmington, Del., assignor to E. I. du Pont de Nemours and Company, Wilmington, Del., a corporation of Delaware
No Drawing. Filed Apr. 30, 1962, Ser. No. 191,310
9 Claims. (Cl. 260—247.1)

This invention relates to new isothiazole derivatives and their preparation.

Compounds having the isothiazole structure, that is, the structure

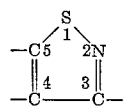

(the ring atoms are numbered for easier reference) have been unknown until recently except in the form of bicyclic compounds where the isothiazole nucleus is fused to a benzene nucleus, i.e., benzoisothiazoles. It was only in 1956 that isothiazoles wherein the ring carbon atoms bear monovalent substituents were first reported by Adams and Slack (Chemistry & Industry 1956, 1232). Little is known of the chemistry of isothiazoles. In particular, no isothiazoles having sulfenamido substituents have been reported.

The new compounds made available by this invention are the 4-cyanoisothiazolesulfenamides of the general formula

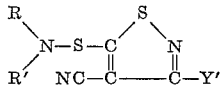

where Y' is chlorine or a sulfenamido group

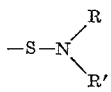

each of R and R' is hydrogen, alkyl or cycloalkyl; and R and R' attached to the same nitrogen atom can together form a divalent radical (—R—R'—) which is an alkylene group of 2–6 chain carbons which bear a total of up to 2 (i.e., 0–2) substituents (other than hydrogen) of 1–2 carbons, 3-Q-1,5-pentylene, or substituted 3-Q-1,5-pentylene where the substituents, which are 1–2 alkyl groups of 1–2 carbons, are bonded to carbon, Q being a chalcogen of atomic number 8–16, i.e., oxygen or sulfur. The preferred sulfenamides are those wherein R and R' taken singly are hydrogen, or alkyl or cycloalkyl of 1–10 carbons, e.g., alkyl of 1–10 carbons, or cycloalkyl or alkylcycloalkyl of 5–10 carbons, and R and R' taken together are as defined above.

The products of this invention are prepared by a process which comprises reacting an amine reactant of the formula

where R and R' have the previously stated significance (i.e., ammonia or a primary or secondary amine), with a 4-chloroisothiazolo[4,5,d]isothiazole of the formula

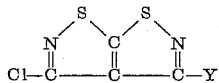

where Y is one of the groups Cl or SCl, the amine preferably being used with respect to the other reactant in a mole ratio of about 2:1 when Y is Cl and about 4:1 when Y is —SCl.

The reaction is presented by the equations:

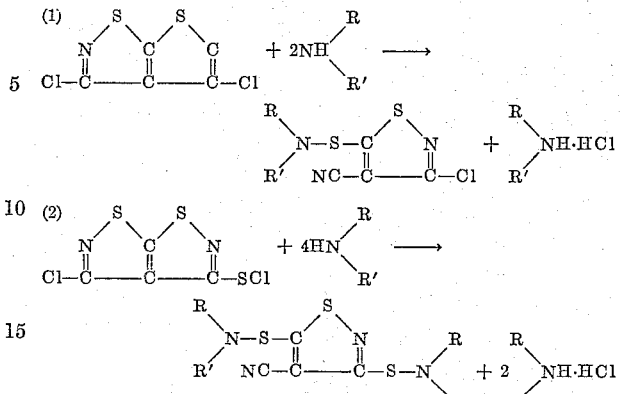

The reaction mechanism is not fully known but, in either case, the reaction results in the opening of one of the isothiazole nuclei between the sulfur and nitrogen atoms with formation of a cyano group.

The preferred amine reactants are those of formula

wherein R and R' are as defined above in connection with the preferred products of this invention.

With reference to Reaction 1 above, the indicated mole ratio (2:1) of amine reactant to 3,4-dichloroisothiazolo-[4,5,d]isothiazole is, of course, desirable for full utilization of the latter reactant which is usually the more expensive one. However, it is not critical since, on the one hand, the reaction will also proceed, although with a decrease in yield, at a lower mole ratio, e.g., 1.5:1; and, on the other hand, an excess of amine reactant, e.g., up to a mole ratio of 4:1 or even higher, even though not necessary, can be used without harmful consequences.

With reference to Reaction 2, it is also permissible to depart from the indicated mole ratio (4:1) of amine reactant to 4-chloroisothiazolo[4,5,d]isothiazolesulfenyl chloride. Thus, an excess of amine reactant, e.g., a mole ratio of 6:1 or even higher, while not necessary, can be used if desired. On the other hand, a mole ratio lower than 4:1 can be used, but when this ratio is decreased by a significant amount, a competitive reaction takes place to some extent, whereby only the chlorine atom of the sulfenyl chloride group reacts with the amine reactant, the 4-chloroisothiazolo portion of the molecule remaining unaffected. The product of this competitive reaction is therefore a 4-chloroisothiazolo[4,5,d]-3-isothiazolesulfenamide of the general formula

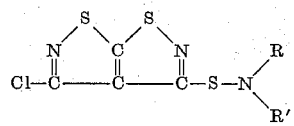

For this reason, it is generally preferred that the amine reactant be used in approximately the stoichiometric amount required by Equation 2, e.g., in a molar ratio with respect to the sulfenyl chloride of at least 3.8:1, when it is desired to obtain the 4-cyanoisothiazole-3,5-bis-sulfenamide essentially free from 4-chloroisothiazolo[4,5,d]-3-isothiazolesulfenamide, thus avoiding subsequent separation of the two compounds. However, this is by no means essential since useful amounts of the first named compound are obtained, in admixture with the second named compound, even when the mole ratio is substantially lower than 4:1. In practice, it is entirely feasible to use any mole ratio of amine reactant to sulfenyl chloride higher than 3:1. The mixture of reaction products obtained at the lower ratio can, if desired, be separated into its components by fractional crystallization since the two products differ in solubilities and melting points. Such a separation is, however, unnecessary for at least one important practical application of the products of this invention, viz., their use as rubber vulcanization accelerators, since both the 4-cyanoisothiazole-3,5-bis-sulfenamides and the 4-chloroisothiazolo[4,5,d]-3-isothiazolesulfenamides are very effective for this purpose.

The conditions under which Reactions 1 and 2 are conducted are not critical. However, the process is conveniently conducted in an organic liquid medium which is at least a partial solvent for the reactants, e.g., which dissolves them to the extent of at least 1% by weight. Any substantially unreactive solvent can be used for this purpose. Solvents free from active hydrogen, that is, hydrogen attached to elements other than carbon, are suitable, such as aromatic hydrocarbons or halohydrocarbons, e.g., benzene, toluene, chlorobenzene, aliphatic halohydrocarbons, e.g., carbon tetrachloride, chloroform, tetrachloroethylene; acylic or cyclic ethers, e.g., di-n-butyl ether, 1,2-dimethoxyethane, tetrahydrofuran, dioxan; ketones such as acetone, methyl ethyl ketone; low melting sulfones such as cyclic tetramethylenesulfone; and the like.

The reaction is often exothermic, especially when 4-chloroisothiazole[4,5,d]-3-isothiazolesulfenyl chloride is used, in which case it can proceed at an external temperature as low as —20° C., and some cooling may be desirable. Ordinary temperature in the range of 15 to 25° C. is satisfactory but, if it is desired to make the reaction proceed faster, moderate heating can be applied. There is in general no advantage in exceeding a temperature of about 100° C. The reaction is rapid and is generally substantially completed in periods varying from a few minutes to a few hours. Closed vessels can be used when the amine reactant is highly volatile.

The reaction products are in general crystalline solids soluble in organic solvents. They can be isolated from the reaction mixture in any suitable way. A convenient procedure consists in removing the amine hydrochloride by filtration and crystallizing the product from the filtrate, with or without previous concentration. If necessary, it can be recrystallized from a suitable solvent.

The invention is illustrated in the following examples, which also describe the preparation of the starting materials. In addition, the results of standard tests performed on various sulfenamides of the invention to substantiate their utility as vulcanization accelerators are summarized in the examples. These tests involved determination of Mooney Scorch (ASTM-Method D1646–59T) and stress-strain as determined by Scott machine (ASTM–D412–51T).

EXAMPLE I

*3-Chloro-4-Cyano-5-Isothiazolesulfenylmorpholine*

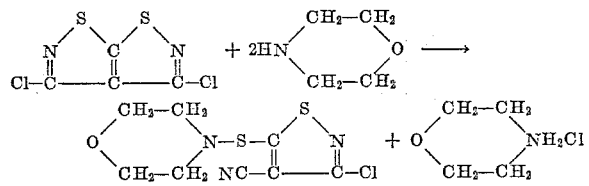

A mixture of 2.11 g. (0.01 mole) of 3,4-dichloroisothiazolo[4,5,d]isothiazole, 3.48 g. (0.04 mole) of morpholine and 150 ml. of tetrahydrofuran was heated under reflux for 5 hours and allowed to stand overnight at room temperature. Filtration of the cooled reaction mixture gave 1.23 g. of morpholine hydrochloride. Evaporation of the filtrate and crystallization of the residue from benzene gave 2.33 g. (89% yield) of 3-chloro-4-cyano-5-isothiazolesulfenylmorpholine as glistening plates that melted at 86–88° C. An analytical sample recrystallized from aqueous methanol melted at 88–88.5° C.

*Analysis.*—Calc'd for $C_8H_8ClN_3OS_2$: C, 36.74; H, 3.08; N, 16.07. Found: C, 36.98; H, 3.13; N, 15.85.

Ultraviolet: $\lambda_{max.}$ in ethanol, 282 m$\mu$ ($\epsilon$=7680, 272 m$\mu$ ($\epsilon$=7840), 222 m$\mu$ ($\epsilon$=12,050).

Infrared: 3.37, 3.42 and 3.49 $\mu$ (sat. CH), 4.49 $\mu$ (CN), and 6.70 and 7.52 $\mu$ (isothiazole).

The starting material in this example, 3,4-dichloroisothiazolo[4,5,d]isothiazole, may be prepared by chlorination of 2,2-dicyano-1,1-disodiomercaptoethylene in accordance with the equation

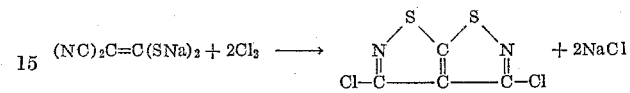

A typical preparation is as follows:

A vigorous stream of chlorine gas was passed into a stirred slurry of 20 g. (0.108 mole) of 2,2-dicyano-1,1-disodiomercaptoethylene in 200 ml. of distilled carbon tetrachloride. The mixture was quickly heated to reflux by the heat of reaction. The chlorine flow was continued for about one hour, when the heat evolution ceased. After standing overnight, the reaction mixture was filtered to separate the sodium chloride and the filtrate was concentrated in a stream of nitrogen to give an oily crystalline residue. The residue was a mixture consisting principally of 3,5-dichloro-4-isothiazolecarbonitrile,

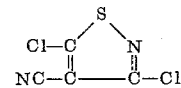

with a smaller amount of 3,4-dichloroisothiazolo[4,5,d]-isothiazole. The first component was separated by extraction of the mixture with warm petroleum ether (B.P. 30–60° C.) in which it is soluble, followed by concentration of the petroleum ether extract and steam distillation, whereby it was obtained as a white crystalline solid, M.P. 64–65° C. The insoluble residue from the petroleum ether extraction consisted of 2.0 g. of an orange solid, M.P. 160–170° C., which, on sublimation under reduced pressure, yielded white crystals of 3,4-dichloroisothiazolo-[4,5,d]isothiazole, M.P. 183–185° C.

*Analysis.*—Calc'd for $C_4Cl_2N_2S_2$: C, 22.77; Cl, 33.61; N, 13.38; S, 30.39. Found: C, 23.03; Cl, 33.48; N, 13.50; S, 30.46.

The 2,2-dicyano-1,1-disodiomercaptoethylene used in the above preparation may be prepared and isolated by the following modification of the procedure described in U.S. Patent 2,533,233:

Malononitrile (66 g., 1 mole) was added slowly to a suspension of 80 g. (2 moles) of sodium hydroxide in 900 ml. of 95% alcohol while the temperature of the mixture was maintained below 40° C. Then carbon disulfide (76 g., 1 mole) was added dropwise with cooling over a period of 30 minutes. The heavy, yellow slurry was stirred an additional hour at room temperature and filtered. The yellow residue was triturated in alcohol, collected on a filter and dried in a vacuum oven at 80° C./1 mm. for 24 hours. There was obtained 180 g. (98% yield) of 2,2-dicyano-1,1-disodiomercaptoethylene.

EXAMPLE II

*4,4'-(4-Cyanoisothiazole-3,5-Disulfenyl)Dimorpholine*

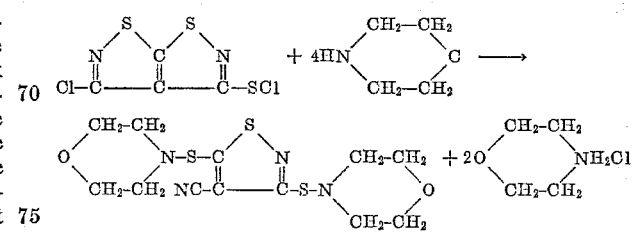

To a solution of 4.86 g. (0.02 mole) of 4-chloroisothiazolo[4,5,d]-3-isothiazolesulfenyl chloride in 200 ml. of tetrahydrofuran at 0–5° C. was added over a 30-minute period a solution of 6.96 g. (0.08 mole) of morpholine in 20 ml. of tetrahydrofuran. The reaction mixture was allowed to warm to room temperature while being stirred for one hour. It was then filtered to remove the morpholine hydrochloride and the filtrate was evaporated under reduced pressure to give an oily residue. Trituration of the residue with anhydrous diethyl ether, followed by filtration gave, as a first crop from the ether filtrate, 4.59 g. (67% yield) of 4,4'-(4-cyanoisothiazole-3,5-disulfenyl)dimorpholine, M.P. 101–103° C. An analytical sample was recrystallized from a mixture of cyclohexane and benzene.

*Analysis.*—Calc'd for $C_{12}H_{16}N_4O_2S_3$: C, 41.84; H, 4.68; N, 16.27. Found: C, 42.49; H, 4.47; N, 15.31.

Ultraviolet: $\lambda_{max.}$ in ethanol 282 m$\mu$ ($\epsilon$=9400), 228 m$\mu$ ($\epsilon$=12,900), 216 m$\mu$ ($\epsilon$=13,400).

Infrared: 3.38, 3.45 and 3.5$\mu$ (sat. CH), 4.5$\mu$ (CN) and 7.45$\mu$ (isothiazole).

The starting material in this example, 4-chloroisothiazolo[4,5,d]-3-isothiazolesulfenyl chloride, is prepared by chlorination of 3,5-disodiomercapto-4-isothiazolecarbonitrile in accordance with the equation

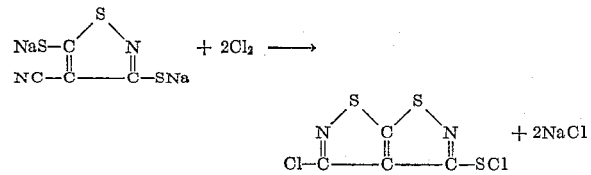

A typical preparation is as follows:

A vigorous stream of chlorine gas was passed into a stirred slurry of 10 g. (0.046 mole) of dry 3,5-disodiomercapto-4-isothiazolecarbonitrile in 200 ml. of distilled carbon tetrachloride while the reaction mixture was maintained at reflux temperature, at first by the heat of the reaction and later by the application of heat. The hot reaction mixture was filtered to remove the sodium chloride. On cooling the filtrate to 0° C. there was obtained 5.9 g. of a precipitate of 4-chloroisothiazolo-[4,5,d]-3-isothiazolesulfenyl chloride as yellow needles melting at 147–149° C. A second crop of 0.7 g. (total yield 59%) was obtained by concentration of the mother liquor.

*Analysis.*—Calc'd for $C_4Cl_2N_2S_3$: Cl, 29.16; S, 39.57. Found: Cl, 28.12; S, 39.10.

The 3,5-disodiomercapto-4-isothiazolecarbonitrile used in the above preparation can be prepared by sulfurization of 2,2-dicyano-1,1-disodiomercaptoethylene in accordance with the equation

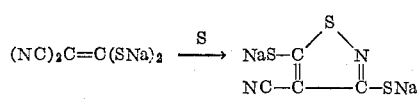

A typical preparation is as follows:

A mixture of 16.0 g. of 2,2-dicyano-1,1-disodiomercaptoethylene, 200 ml. of methanol and 2.9 g. of sulfur was heated under reflux for 30 minutes and then filtered from a little insoluble material and evaporated to dryness at reduced pressure. The residue was taken up in 100 ml. of hot 95% ethyl alcohol, and the solution was cooled and diluted with ethyl acetate and ethyl ether to precipitate the tetrahydrate of 3,5-disodiomercapto-4-isothiazolecarbonitrile as a crystalline solid. The product, collected in three fractions, weighed 18.9 g. after drying in air. Drying in a vacuum oven at 80° C. and 1 mm. of mercury pressure in the presence of phosphoric anhydride gave the anhydrous 3,5-disodiomercapto-4-isothiazolecarbonitrile.

*Analysis.*—Calc'd for $C_4N_2S_3Na_2$: C, 22.02; N, 12.84; S, 44.08. Found: C, 22.29; N, 12.70; S, 42.83.

EXAMPLE III

*4,4'-(4-Cyanoisothiazole-3,5-Disulfenyl)Di-(Cis-2,6-Dimethylmorpholine)*

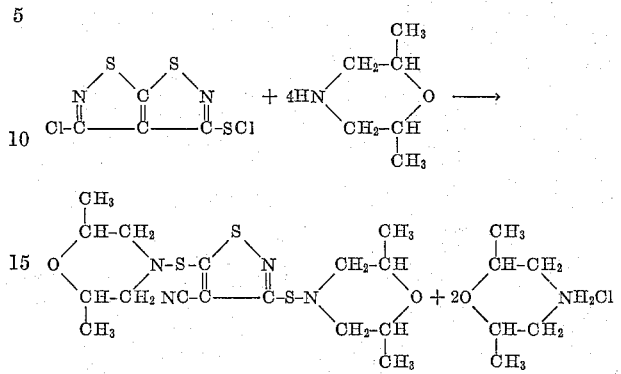

To a solution of 4.86 g. (0.02 mole) of 4-chloroisothiazolo[4,5,d]-3-isothiazolesulfenyl chloride in 150 ml. of tetrahydrofuran was added at 20–25° C. over a period of 15 minutes a solution of 9.20 g. (0.08 mole) of cis-2,6-dimethylmorpholine in 10 ml. of tetrahydrofuran. The mixture was stirred for 2.5 hours at room temperature, filtered to remove the amine hydrochloride, and the filtrate was evaporated at reduced pressure under anhydrous conditions to give an oily residue. Trituration of the residue in methanol and filtration gave 5.13 g. (64% yield) of 4,4'-(4-cyanoisothiazole-3,5-disulfenyl)di-(cis-2,6-dimethylmorpholine), M.P. 97.5–102° C. An analytical sample recrystallized from petroleum ether melted at 106–107° C.

*Analysis.*—Calc'd for $C_{16}H_{24}N_4O_2S_3$: C, 47.98; H, 6.04. Found: C, 47.85; H, 5.94.

Ultraviolet: $\lambda_{max.}$ in ethanol 282 m$\mu$ ($\epsilon$=9570), 217 m$\mu$ ($\epsilon$=14,000).

Infrared: 3.36, 3.41 and 3.49 $\mu$ (sat. CH), 4.5 $\mu$ (conj. CN), 6.75 and 7.54 $\mu$ (isothiazole), 7.28 $\mu$ (CCH$_3$), 9.25 $\mu$.

EXAMPLE IV

*4-Cyanoisothiazole-3,5-Bis(N-Cyclohexylsulfenamide)*

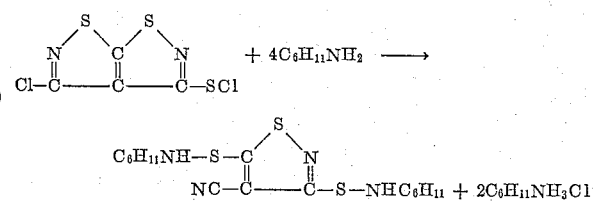

To a solution of 4.86 g. (0.22 mole) of 4-chloroisothiazolo[4,5,d]-3-isothiazolesulfenyl chloride in 50 ml. of tetrahydrofuran cooled to −10° C. was added over about 20 minutes a solution of 7.92 g. (0.08 mole) of cyclohexylamine in 10 ml. of tetrahydrofuran. After the addition was completed, the mixture was stirred for an additional hour at 0–5° C. and then allowed to stand for 2 hours at room temperature. Filtration and evaporation of the filtrate gave an oil that solidified on standing. Trituration of this product in warm petroleum ether and filtration gave from the filtrate 6.7 g. (90% yield) of crude 4-cyanoisothiazole-3,5-bis(N-cyclohexylsulfenamide) that melted at 97–104° C. After recrystallization from hexane, this product melted at 108–110° C.

*Analysis.*—Calc'd for $C_{16}H_{24}N_4S_3$: C, 52.14; H, 6.57; N, 15.20. Found: C, 52.56; H, 6.74; N, 15.02.

Ultraviolet: $\lambda_{max.}$ in ethanol 284 m$\mu$ ($\epsilon$=11,700), 235 m$\mu$ ($\epsilon$=11,300), 217 m$\mu$ ($\epsilon$=12,200).

Infrared: 3.0 and 3.04 $\mu$ (NH), 3.42 and 3.5 $\mu$ (sat. CH), 4.5 $\mu$ (conj. CN), 6.75 and 7.68 $\mu$ (isothiazole).

EXAMPLE V

*4-Cyanoisothiazole-3,5-Bis(N-t-Butylsulfenamide)*

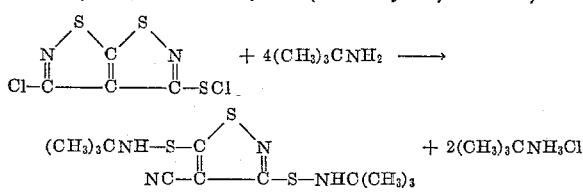

To a solution of 4.86 g. (0.02 mole) of 4-chloroisothiazolo[4,5,d]-3-isothiazolesulfenyl chloride in 100 ml. of tetrahydrofuran at 0–5° C. was added over 15 minutes 5.84 g. (0.08 mole) of t-butylamine. The reaction mixture was stirred for 3 hours at 35° C. and then filtered. Evaporation of the filtrate at reduced pressure gave a residual oil that crystallized on cooling and trituration with petroleum ether. Extraction of the solid with petroleum ether and crystallization from the extract gave 3.67 g. (58% yield) of 4-cyanoisothiazole-3,5-bis(N-t-butylsulfenamide) that melted at 70–74° C. An analytical sample crystallized from petroleum ether melted at 73–75° C.

*Analysis.*—Calc'd for $C_{12}H_{20}N_4S_3$: C, 45.53; H, 6.37; N, 17.71. Found: C, 45.53; H, 6.30; N, 17.71.

Ultraviolet: $\lambda_{max.}$ in ethanol 281 m$\mu$ ($\epsilon$=10,100), 217 m$\mu$ ($\epsilon$=11,800).

Infrared: 3.07 $\mu$ (NH), 3.42 $\mu$ (sat. CH), 4.53 $\mu$ (conj. CN), 7.6 $\mu$ (isothiazole).

EXAMPLE VI

*1,1'-(4-Cyanoisothiazole-3,5-Disulfenyl)Dipiperidine*

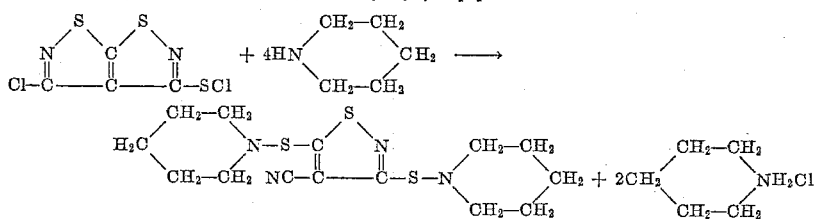

A solution of 4.86 g. (0.02 mole) of 4-chloroisothiazolo[4,5,d]-3-isothiazolesulfenyl chloride in 25 ml. of tetrahydrofuran was added dropwise to a stirred solution of 6.84 g. (0.08 mole) of piperidine in 100 ml. of tetrahydrofuran at 15–20° C. The reaction mixture was then stirred 5 hours at room temperature, then allowed to stand overnight. Filtration removed 4.55 g. (94% yield) of piperidine hydrochloride. Evaporation of the filtrate gave a residual oil which was taken up in ether. The ether solution was washed successively with water, dilute hydrochloric acid and water. After drying and evaporation of the ether, an oil remained that crystallized on standing to give 5.5 g. (80% yield) of 1,1'-(4-cyanoisothiazole-3,5-disulfenyl)dipiperidine as a yellow solid, M.P. 69–73° C. The infrared spectrum was consistent with the assigned structure.

While the invention has been illustrated in the foregoing detailed examples by reference to certain specific reactants and reaction products, it is, of course, not limited thereto. Thus, examples of other 3-chloro-4-cyano-5-isothiazolesulfenamides of the formula

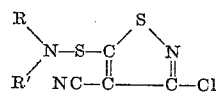

which can be prepared by the procedure of Example I include those shown in Table I below where, for the sake of brevity, only the name of the amine reactant and the formula of the $$-N\begin{smallmatrix}R\\R'\end{smallmatrix}$$

group are given.

TABLE I

| Amine Reactant | $-N\begin{smallmatrix}R\\R'\end{smallmatrix}$ Group |
|---|---|
| Ammonia | $-NH_2$ |
| Methylamine | $-NHCH_3$ |
| Diethylamine | $-N(C_2H_5)_2$ |
| n-Hexylamine | $-NH(CH_2)_5CH_3$ |
| Di-n-octylamine | $-N[(CH_2)_7CH_3]_2$ |
| n-Decylamine | $-NH(CH_2)_9CH_3$ |
| Cyclopentylamine | $-NH-CH\begin{smallmatrix}CH_2-CH_2\\\\CH_2-CH_2\end{smallmatrix}$ |
| Dicyclohexylamine | $-N\begin{smallmatrix}CH\\\\CH\end{smallmatrix}\begin{smallmatrix}(CH_2-CH_2)_2\\\\(CH_2-CH_2)_2\end{smallmatrix}$ |
| 2,6-Diethylcyclohexylamine | $-NH-CH\begin{smallmatrix}CH(C_2H_5)-CH_2\\\\CH(C_2H_5)-CH_2\end{smallmatrix}CH_2$ |

TABLE I—Continued

| Amine Reactant | $-N\begin{smallmatrix}R\\R'\end{smallmatrix}$ Group |
|---|---|
| 2-Ethylethylenimine | $-N\begin{smallmatrix}CH-C_2H_5\\\\CH_2\end{smallmatrix}$ |
| 2-Methylpyrrolidine | $-NH\begin{smallmatrix}CH_2-CH_2\\\\CH-CH_2\\CH_3\end{smallmatrix}$ |
| Hexamethylenimine | $-NH\begin{smallmatrix}CH_2-CH_2-CH_2\\\\CH_2-CH_2-CH_2\end{smallmatrix}$ |
| Thiamorpholine | $-NH\begin{smallmatrix}CH_2-CH_2\\\\CH_2-CH_2\end{smallmatrix}S$ |

Examples of other 4-cyanoisothiazole-3,5-bis-sulfenamides of the formula

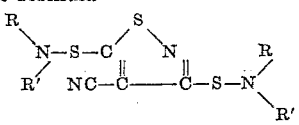

which can be prepared by the procedure of Examples II–VI include those shown in Table II below, where the headings are the same as in Table I.

TABLE II

| Amine Reactant | —N(R)(R') Group |
|---|---|
| Ammonia | —NH₂ |
| Dimethylamine | —N(CH₃)₂ |
| Ethylamine | —NHC₂H₅ |
| Isopropylamine | —NHCH(CH₃)₂ |
| n-Amylamine | —NH(CH₂)₄CH₃ |
| Ethyl(n-hexyl)amine | —N(C₂H₅)(CH₂)₅CH₃ |
| n-Octylamine | —NH(CH₂)₇CH₃ |
| Di-n-octylamine | —N[(CH₂)₇CH₃]₂ |
| n-Decylamine | —NH(CH₂)₉CH₃ |
| Cyclopentylamine | —NH—cyclopentyl |
| N-Ethylcyclohexylamine | —N(C₂H₅)(cyclohexyl) |
| 2,6-Diethylcyclohexylamine | —NH—(2,6-diethylcyclohexyl) |
| 2-Decahydronaphthylamine | —NH—(2-decahydronaphthyl) |
| Ethylenimine | —N(CH₂CH₂) |
| 2,3-Dimethylethylenimine | —N(CH(CH₃)CH(CH₃)) |
| Pyrrolidine | —N(CH₂CH₂CH₂CH₂) |
| 2,6-Diethylpiperidine | —N(2,6-diethylpiperidyl) |
| Hexamethylenimine | —N(CH₂CH₂CH₂CH₂CH₂CH₂) |
| Thiamorpholine | —N(CH₂CH₂SCH₂CH₂) |
| 2-Methylthiamorpholine | —N(CH(CH₃)CH₂SCH₂CH₂) |

The 4-cyanoisothiazolesulfenamides of this invention are, as a class, highly effective as rubber vulcanization accelerators as illustrated by the above-mentioned tests on synthetic rubber (25/75 styrene/butadiene copolymer) and on natural rubber.

Since obvious modifications and equivalents in the invention will be apparent to those skilled in the chemical arts, I propose to be bound solely by the appended claims.

The embodiments of the invention in which an exclusive property or privilege is claimed are defined as follows:

1. A compound of the formula:

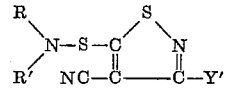

where Y' is a member of the group consisting of chlorine and —S—N(R)R'; each of R and R' taken individually is a member of the group consisting of hydrogen, alkyl of 1 to 10 carbons and cycloalkyl of 5 to 10 carbons; and R and R' taken together are a member of the class consisting of alkylene of 2–6 chain carbons which bear a total of up to 2 alkyl substituents of 1–2 carbons, 3-Q-1,5-pentylene, and substituted 3-Q-1,5-pentylene where the substituents, which are 1–2 alkyl groups of 1–2 carbons, are bonded to carbon, Q being a chalcogen of atomic number 8–16.

2. 3-chloro-4-cyano-5-isothiazolesulfenylmorpholine.
3. 4,4'-(4-cyanoisothiazole-3,5-disulfenyl)dimorpholine.
4. 4,4'-(4-cyanoisothiazole-3,5-disulfenyl)di - (cis - 2,6-dimethylmorpholine).
5. 4 - cyanoisothiazole - 3,5 - bis(N - cyclohexylsulfenamide).
6. 4-cyanoisothiazole-3,5-bis(N-t-butylsulfenamide).
7. 1,1'-(4-cyanoisothiazole-3,5-disulfenyl)dipiperidine.
8. A process of preparing 4-cyanoisothiazole-3,5-bis-(sulfenamides) which comprises contacting, in an organic solvent free of active hydrogen and at a temperature of up to 100° C., one mole of 4-chloroisothiazolo[4,5,d]-3-isothiazolesulfenyl chloride with four moles of an amine reactant of the formula

where each of R and R' taken individually is a member of the group consisting of hydrogen, alkyl of 1 to 10 carbons and cycloalkyl of 5 to 10 carbons; and R and R' taken together are a member of the class consisting of alkylene of 2–6 chain carbons which bear a total of up to 2 alkyl substituents of 1–2 carbons, 3-Q-1,5-pentylene, and substituted 3-Q-1,5-pentylene were the substituents, which are 1–2 alkyl groups of 1–2 carbons, are bonded to carbon, Q being a chalcogen of atomic number 8–16.

9. A process of preparing 3-halo-4-cyano-5-isothiazolesulfenamides which comprises contacting, in an organic solvent free of active hydrogen and at a temperature of up to 100° C., one mole of 3,4-dichloroisothiazolo[4,5,d]-isothiazole with two moles of an amine reactant of the formula

where each of R and R' taken individually is a member of the group consisting of hydrogen, alkyl of 1 to 10 carbons and cycloalkyl of 5 to 10 carbons; and R and R' taken together are a member of the class consisting of alkylene of 2–6 chain carbons which bear a total of up to 2 alkyl substituents of 1–2 carbons, 3-Q-1,5-pentylene, and substituted 3-Q-1,5-pentylene where the substituents, which are 1–2 alkyl groups of 1–2 carbons, are bonded to carbon, Q being a chalcogen of atomic number 8–16.

References Cited in the file of this patent

UNITED STATES PATENTS 2,980,679    Pala    Apr. 18, 1961